(No Model.)
W. H. RHODES.
POST HOLE DIGGER.
No. 281,137. Patented July 10, 1883.
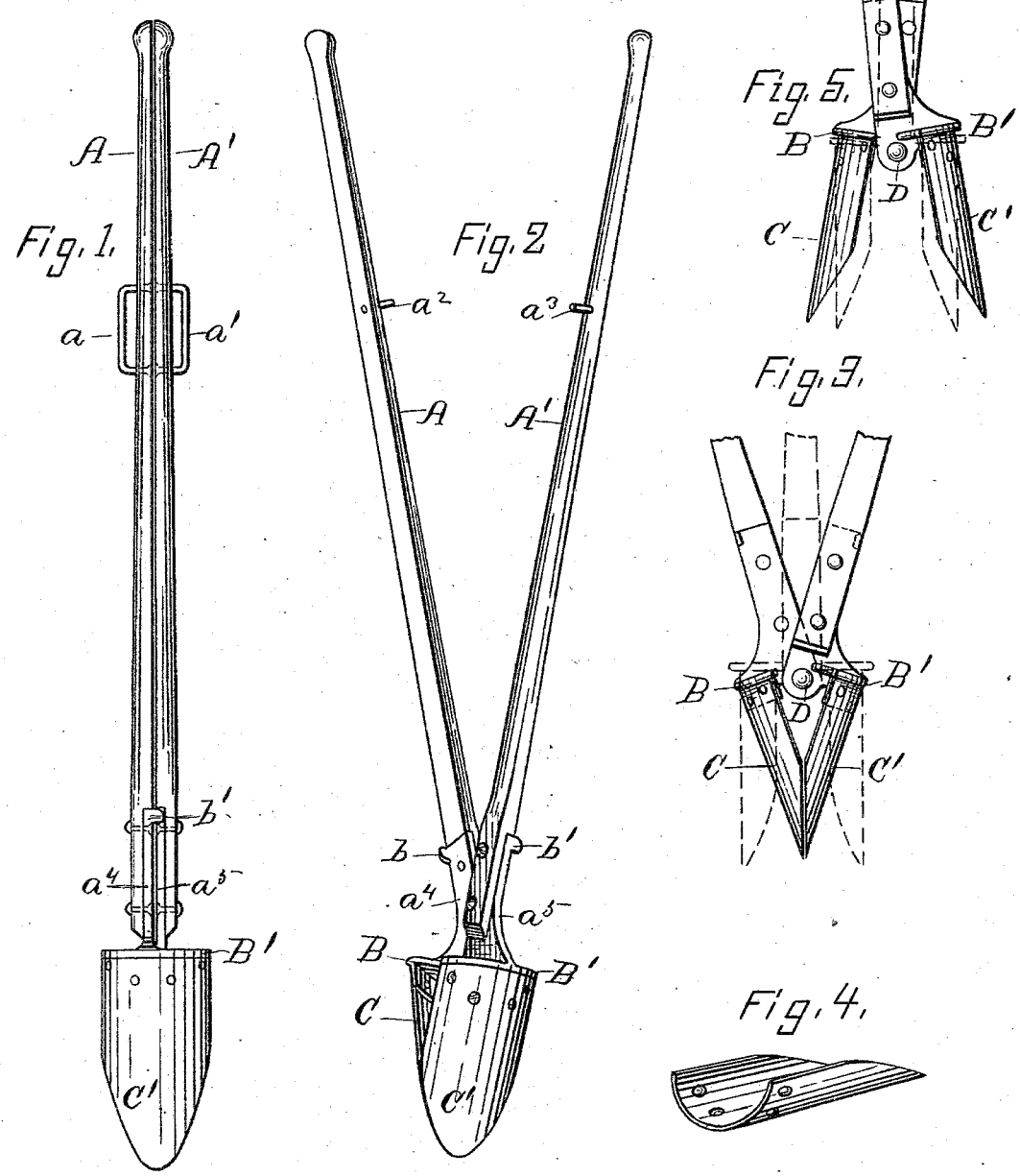
Witnesses:
L. M. Freeman
V. Stanwood
Inventor:
Wm Henry Rhodes
per L. B. Coupland & Co.
Attorneys

UNITED STATES PATENT OFFICE.

WILLIAM H. RHODES, OF CHICAGO, ILLINOIS.

POST-HOLE DIGGER.

SPECIFICATION forming part of Letters Patent No. 281,137, dated July 10, 1883.

Application filed April 6, 1883. (No model.)

*To all whom it may concern:*

Be it known that I, WILLIAM H. RHODES, of Chicago, county of Cook, and State of Illinois, have invented certain new and useful Improvements in a Post-Hole Digger, of which the following is a full, clear, and exact description, that will enable others to make and use the same, reference being had to the accompanying drawings, and to letters of reference marked thereon, forming a part of this specification.

The object of this invention is to so construct a device of this nature as to permit the digging-blades proper to close together at the lower ends, forming a tight cone-shaped receptacle, which prevents the escape of the dirt until the blades are thrown apart. It also consists of other novel features in the construction and arrangement of the parts, as will be hereinafter more fully set forth and described in detail.

Figure 1 is a side elevation of a device embodying my improved features, showing the handles closed; Fig. 2, a view of the same showing the handles thrown apart. Fig. 3 is a front view, the handles being broken away and the blades or jaws closed, the dotted lines indicating the opposite or normal position; Fig. 4, a detached perspective of one of the cutting-blades; and Fig. 5 shows the two different open positions the device is adapted to assume.

Referring to the drawings, A A' represent the two handles composing the operating-levers, each of which is of a semicircular form, and when closed the inner flat surfaces bear against each other and form a cylindrical body, as shown in Fig. 1 of the drawings. These handles, as a matter of necessary convenience, are provided with the stirrup hand-grasps $a\ a'$, as shown in Fig. 1 of the drawings, or with the straight handles $a^2\ a^3$, projecting at right angles to the handles proper, as shown in Fig. 2 of the drawings. The lower ends of the handles A A' are bolted or otherwise rigidly secured to the upward projecting ends $a^4\ a^5$ of the head-pieces B B'. The upper ends of these head-pieces are provided with the short stop-lugs $b\ b'$, which project at right angles to the joining faces of the head-pieces, and are adapted to overlap the opposite edges of the same, serving the purpose of preventing the handles from passing each other when thrown together to spread apart the blades C C', the dotted lines in Fig. 5 indicating this position, while the blades themselves (shown in the same figure) show the widest distance apart to which the blades may be moved. This is effected by springing the handles slightly apart in the same plane, so that the lugs $b\ b'$ will not bear against and pass by the ends $a^4\ a^5$ of the head-pieces, thus allowing the handles to cross each other, in order to more easily expel the contents of the digger-receptacle in cases where the dirt becomes very closely packed in the digger. Ordinarily, however, it is not necessary to open the jaws wider than the lugs or stops $b\ b'$ permit, that being the position of the handles shown in Fig. 1 of the drawings.

The head-pieces B B' are pivoted together at the inner overlapping parts, D. The outer edges are of a circular form, corresponding to the upper ends of the curved blades C C', and provide a flanged shoulder-bearing for the same, the blades being riveted or otherwise rigidly secured to the head-pieces. Beginning about the longitudinal center of the segmental blades, the edges of the same are cut away inward at an oblique angle, so as to narrow these parts to a rounded point and permit the lower half of the blades to shut together, completely closing the lower end and forming a tight receptacle, for the purpose of preventing the escape of the earth grasped until it has been removed from the hole.

A series of hand-grasps may be placed upon the handles proper at regular intervals, as may be required.

Having thus described my invention, what I claim as new, and desire to secure by Letters Patent, is—

1. In a post-hole digger, the combination, with the handles A A', of the head-pieces B B', provided with the upward-projecting ends $a^4\ a^5$, and the stop-lugs $b'\ b$, whereby said handles are locked when closed together, or adapted to cross each other, as described.

2. In a post-hole digger, the combination of the following elements: the digging-blades C C', having the lower half thereof cut away at an oblique angle, the head-pieces B B', adapted to have a pivotal movement, the projecting ends $a^4\ a^5$, the stop-lugs $b\ b'$, and the handles A A', provided with the hand-grasps $a\ a'$, all combined, arranged, and operating substantially as described.

WILLIAM HENRY RHODES.

Witnesses:
L. M. FREEMAN,
L. B. COUPLAND.